(12) United States Patent
Morris

(10) Patent No.: US 8,745,800 B1
(45) Date of Patent: Jun. 10, 2014

(54) FOLD OUT RAMP

(71) Applicant: Donald Morris, Littleton, CO (US)

(72) Inventor: Donald Morris, Littleton, CO (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 13/943,603

(22) Filed: Jul. 16, 2013

(51) Int. Cl.
*B65G 69/28* (2006.01)

(52) U.S. Cl.
USPC ............................ 14/71.3; 14/71.1; 414/921

(58) Field of Classification Search
USPC ................................ 14/71.1, 71.3; 414/921
See application file for complete search history.

(56) References Cited

U.S. PATENT DOCUMENTS

| | | | |
|---|---|---|---|
| 5,636,399 A * | 6/1997 | Tremblay et al. | 14/71.1 |
| 6,598,253 B1 * | 7/2003 | Allen et al. | 14/71.1 |
| 6,616,396 B2 * | 9/2003 | Sternberg | 414/538 |
| 6,802,095 B1 * | 10/2004 | Whitmarsh et al. | 14/71.3 |
| 6,866,464 B2 * | 3/2005 | Kellogg et al. | 414/537 |
| 7,052,227 B2 * | 5/2006 | Navarro | 414/537 |
| 7,513,552 B2 * | 4/2009 | Carvalho | 296/26.09 |
| 8,359,691 B2 * | 1/2013 | Morris et al. | 14/71.3 |
| 8,505,141 B1 * | 8/2013 | Morris et al. | 14/71.3 |
| 2013/0276247 A1 * | 10/2013 | Saucier et al. | 14/71.7 |

* cited by examiner

*Primary Examiner* — Gary Hartmann
(74) *Attorney, Agent, or Firm* — Christensen O'Connor Johnson Kindness PLLC

(57) ABSTRACT

A ramp assembly includes a ramp portion coupled for rotational movement between a stowed position and a deployed position. A first panel is rotatably coupled to the ramp portion about a first axis so that movement of the ramp portion between the stowed position and the deployed position moves the axis along an arcuate path. The ramp assembly further includes a guide that maintains a fixed position relative to the stowed position of the ramp portion. A second panel is slidably associated with the guide and is rotatably coupled to the first panel about a second axis.

13 Claims, 9 Drawing Sheets

FOLD OUT RAMP

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis on providing systems that enable physically challenged people to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and pivot about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is more gradual and more accessible by wheelchair-bound passengers. Longer ramps are, however, heavier and require more torque about the pivot axis to be reciprocated between deployed and stowed positions. To satisfy the increased torque requirement such fold out ramps use large electric motors, pneumatic devices, or hydraulic actuators to deploy and stow the ramp. Many of such systems cannot be moved manually in the event of failure of the power source unless the drive mechanism is first disengaged. Some existing fold out ramps can be deployed or stowed manually, but they are difficult to operate because one must first overcome the resistance of the drive mechanism. Further, fold out ramps require a depression (or pocket) in the vehicle's vestibule floor in which to store the retracted/stowed ramp. When the ramp is deployed, the aforementioned depression presents an obstacle for wheelchair passengers as they transition from the ramp to the vestibule, and into the vehicle.

As noted above, many existing fold out ramps are equipped with hydraulic, electric, or pneumatic actuating devices. Such devices are obtrusive and make access to and from a vehicle difficult when the ramp is stowed. Moreover, many such fold out ramps have no energy storage capabilities to aid the lifting of the ramp, which would preserve the life of the drive motor or even allow a smaller drive to be employed. Finally, operating systems for such fold out ramps must have large power sources to overcome the moment placed on the hinge by the necessarily long moment arm of the fold out ramp.

In view of the foregoing, there is a need for a fold out ramp for a vehicle that provides a longer ramp surface to reduce the ramp angle, and further includes a compact and efficient operating system.

SUMMARY

A first exemplary embodiment of a disclosed ramp assembly includes a ramp portion coupled for rotational movement between a stowed position and a deployed position. A first panel is rotatably coupled to the ramp portion about a first axis so that movement of the ramp portion between the stowed position and the deployed position moves the axis along an arcuate path. The ramp assembly further includes a guide that maintains a fixed position relative to the stowed position of the ramp portion. A second panel is slidably associated with the guide and is rotatably coupled to the first panel about a second axis.

A second exemplary embodiment of a disclosed ramp assembly includes a ramp portion coupled for rotational movement between a stowed position and a deployed position. A first panel is rotatably coupled to the ramp portion about a first axis so that movement of the ramp portion from the stowed position to the deployed position moves the axis from a raised position to a lowered position. The ramp assembly further includes a guide that maintains a fixed position relative to the stowed position of the ramp portion. A second panel is slidably associated with the guide and is rotatably coupled to the first panel about a second axis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments of the disclosed ramp assembly will now be described with reference to the accompanying drawings where like numerals correspond to like elements. The described embodiments are directed to ramp assemblies, and more specifically, wheelchair ramp assemblies. In particular, several embodiments are directed to wheelchair ramp assemblies suitable for use in buses, vans, etc. Several embodiments of the present invention are directed to compact ramp assemblies for a vehicle that, when stowed, occupy a small amount of space within the vehicle floor, yet deploy to a length that effectively reduces the ramp slope encountered by the mobility impaired, thus facilitating greater independence and safety for wheelchair-bound passengers.

The following discussion proceeds with reference to examples of wheelchair ramp assemblies for use in vehicles having a floor, such as buses, vans, etc. While the examples provided herein have been described with reference to their association with vehicles, it will be apparent to one skilled in the art that this is done for illustrative purposes and should not be construed as limiting the scope of the disclosed subject matter, as claimed. Thus, it will be apparent to one skilled in the art that aspects of the disclosed fold out ramp may be employed with other ramp assemblies used in stationary installations, such as residential buildings and the like. The following detailed description may use illustrative terms such as vertical, horizontal, front, rear, inboard, outboard, curbside, roadside, proximal, distal, etc.; however, these terms are descriptive in nature and should not be construed as limiting. Further, it will be appreciated that various embodiments of the disclosed fold out ramp may employ any combination of features described herein.

Figure 1:
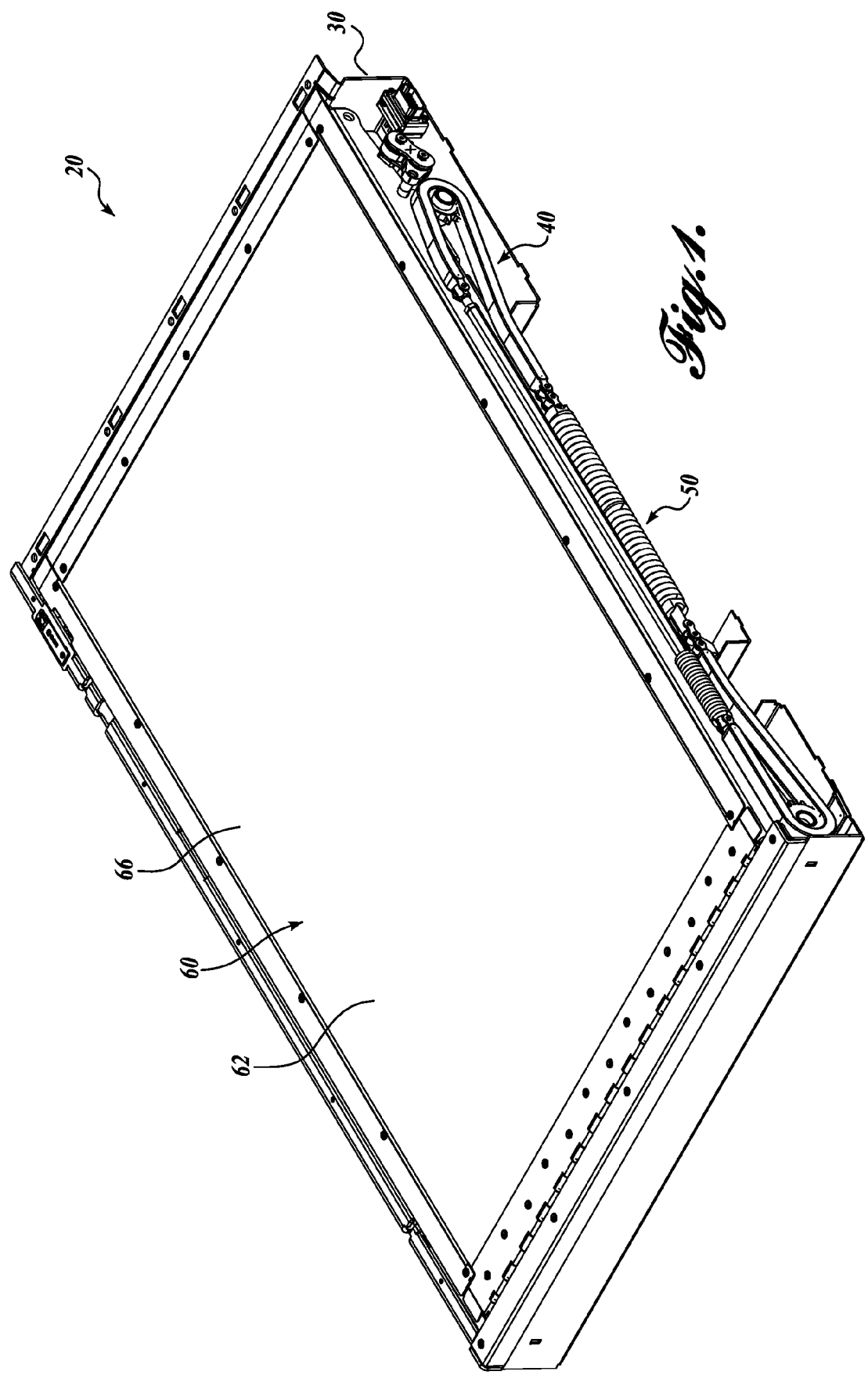
FIG. 1 is an isometric view of an exemplary embodiment of a ramp assembly with a ramp portion in a stowed position.
Figure 2:
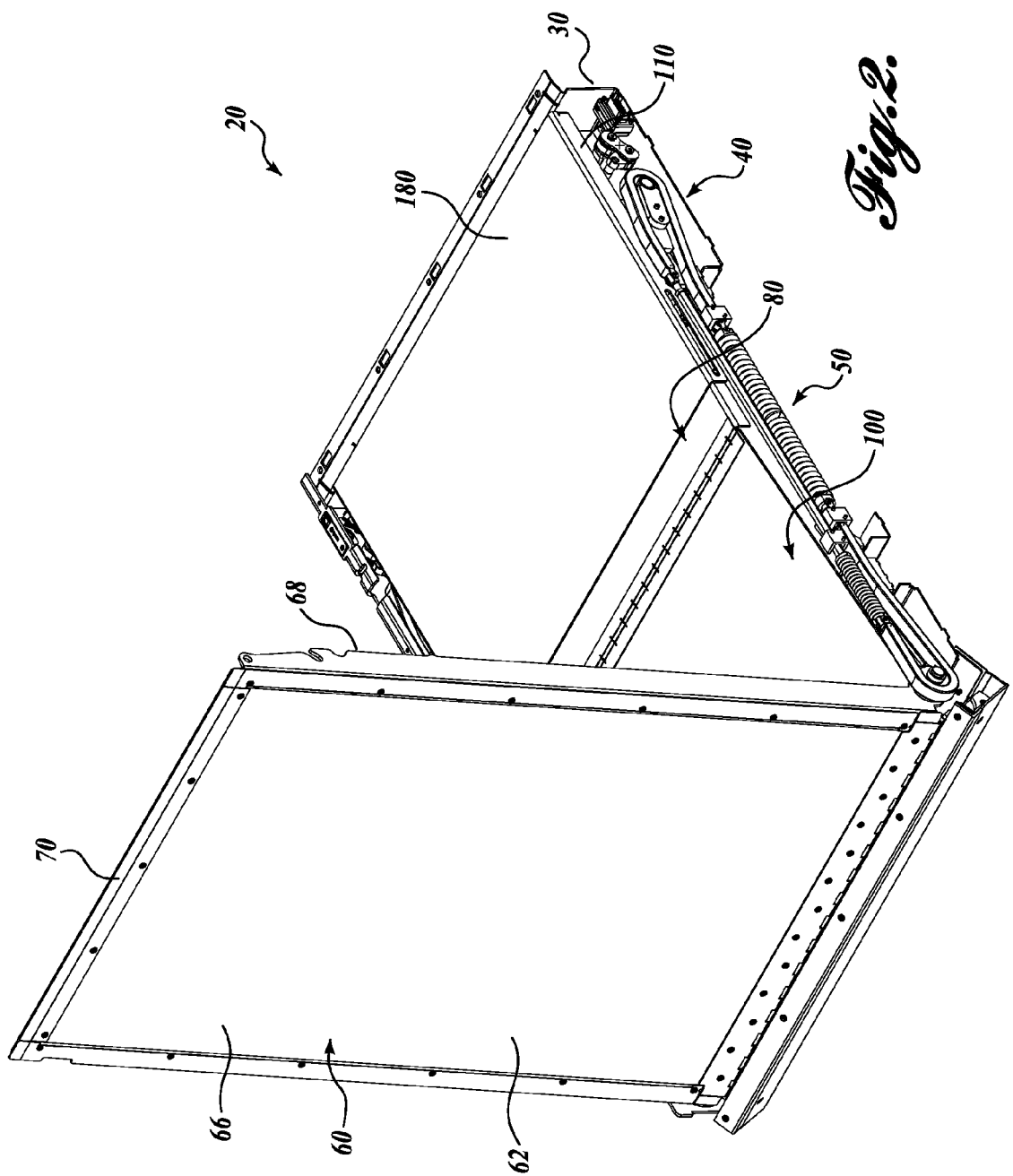
FIG. 2 is an isometric view of the ramp assembly shown in FIG. 1, with the ramp portion in a neutral position.
Figure 3:
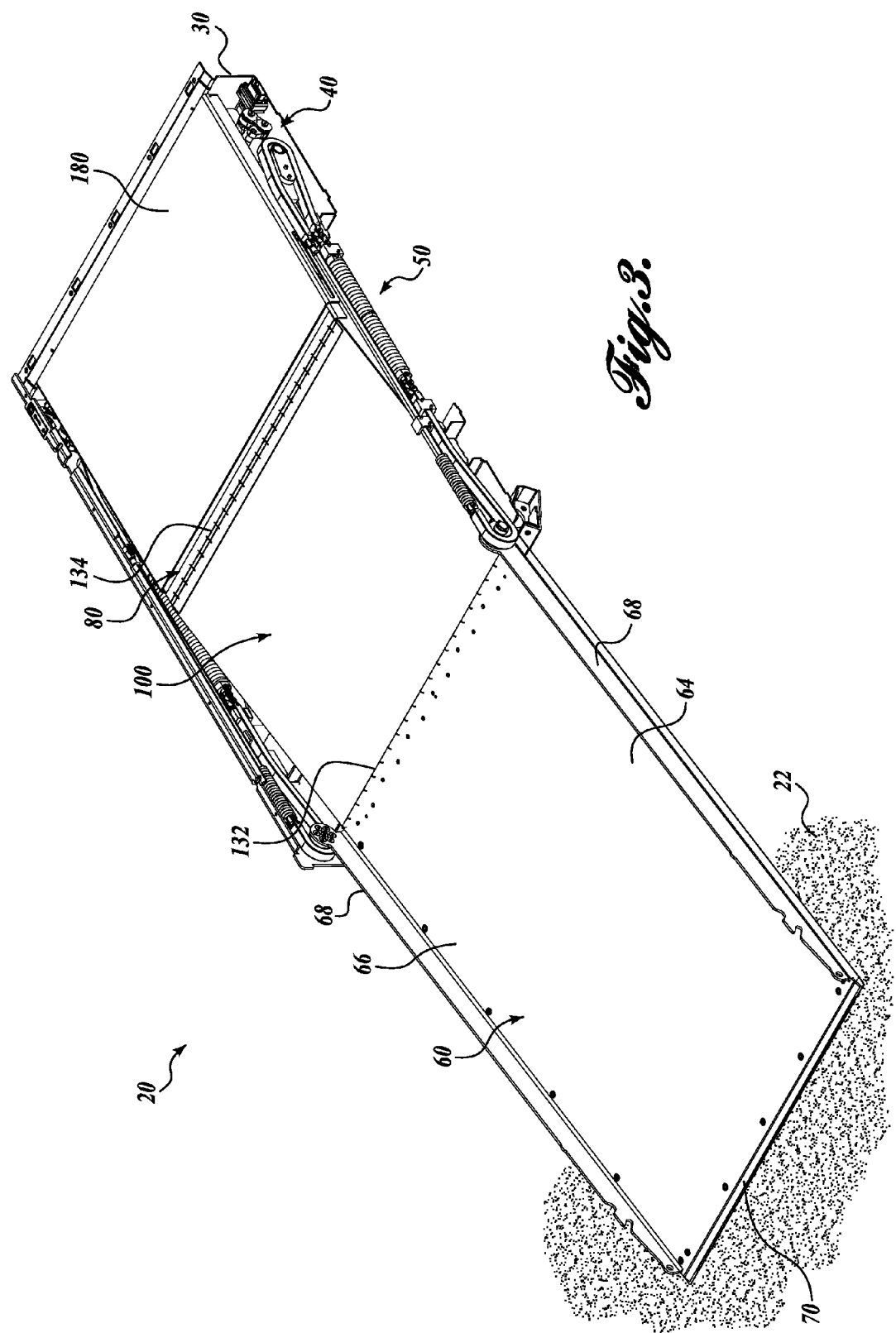
FIG. 3 is an isometric view of the ramp assembly shown in FIG. 1, with the ramp portion in a deployed position.

FIGS. 1-3 illustrate one embodiment of a fold out ramp assembly 20. The ramp assembly 20 includes a frame 30, a drive assembly 40, a counterbalance assembly 50, a ramp portion 60, an inner panel 80, and an intermediate panel 100 disposed between the ramp portion and the inner panel. An exemplary drive assembly 40 and counterbalance assembly 50 suitable for use with the presently disclosed ramp assembly 20 are disclosed in U.S. Pat. No. 7,533,434, the disclosure of which is expressly incorporated herein. It will be appreciated that the drive assembly 40 and the illustrated counterbalance assembly 50 are exemplary only, and that any suitable configuration can be utilized to drive the ramp assembly between the stowed and deployed positions.

The frame 30 of the ramp assembly 20 is adapted to be mounted to a vehicle (not shown) having a floor, such as a bus or a van. The ramp assembly 20 is reciprocal between a stowed position, shown in FIG. 1, and a deployed position, shown in FIG. 3. Between the stowed position and the deployed position is a neutral position, shown in FIG. 2, in which the center of gravity of the ramp portion 60 is located approximately over the center of rotation of the ramp portion.

In the stowed position, the ramp portion 60, inner panel 80, and intermediate panel 100 are located such that the ramp portion 60 is positioned over the inner panel 80 and intermediate panel 100, and a lower surface 62 of the ramp portion 60 faces upward and is substantially coplanar, i.e., flush, with the floor (not shown) of the vehicle. As shown in FIG. 3, in a deployed position, the ramp portion 60 extends in an outboard and downward direction to contact an alighting surface 22, such as a curb or road, so that an upper surface 64 of the ramp portion 60 provides a transition between the vehicle and the surface 22.

Although the illustrated embodiments of the ramp assembly 20 include a frame 30, other embodiments are contemplated in which the ramp assembly 20 does not include a frame 30. When such embodiments are installed in vehicles, the ramp assembly 20 components are attached directly to the structure of the vehicle or to a suitable structure within the vehicle, thus making a frame 30 unnecessary. Similarly, when such embodiments are installed in stationary installations, such as residential buildings and the like, the ramp assembly 20 components are attached to the structure of the building or any other suitable structure within the building. Accordingly, embodiments of the described ramp assembly 20 that do not include a frame should be considered within the scope of the present disclosure.

Figure 7:
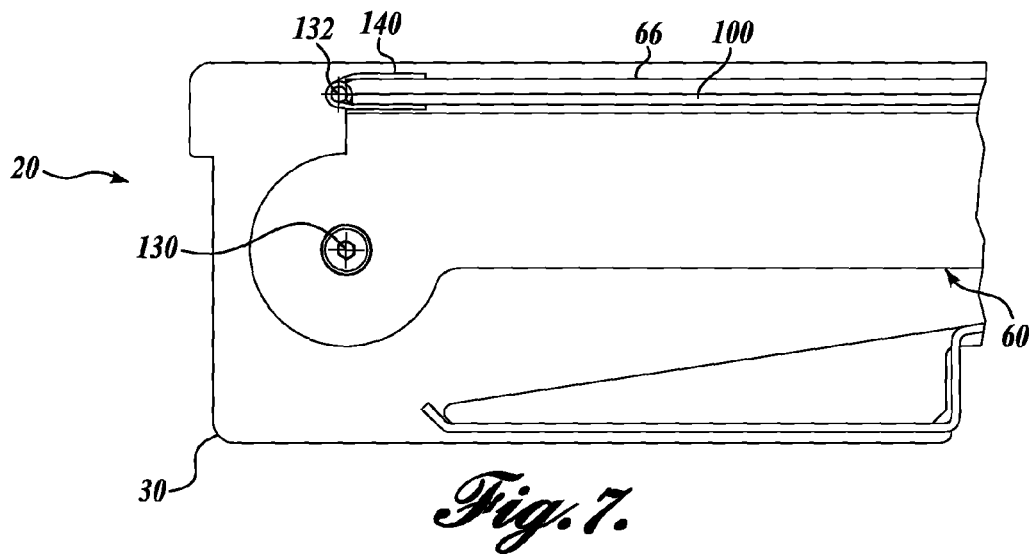
FIG. 7 is a partial cross-sectional side view of an outboard end of the ramp assembly shown in FIG. 4, with the ramp portion in the stowed position.
Figure 8:
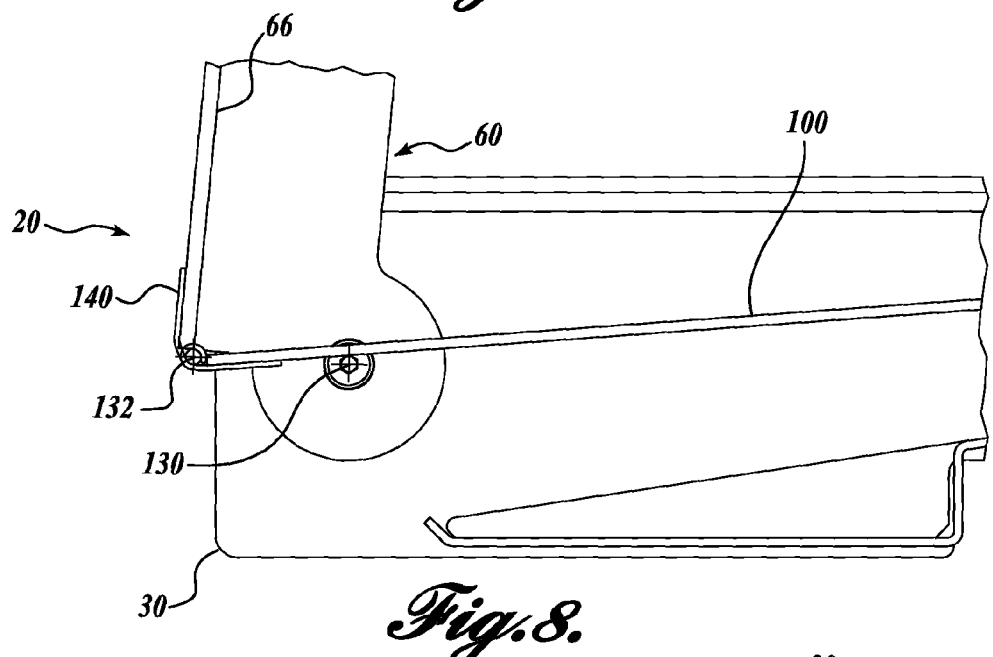
FIG. 8 is a partial cross-sectional side view of the outboard end of the ramp assembly shown in FIG. 7, with the ramp portion in the neutral position.
Figure 9:
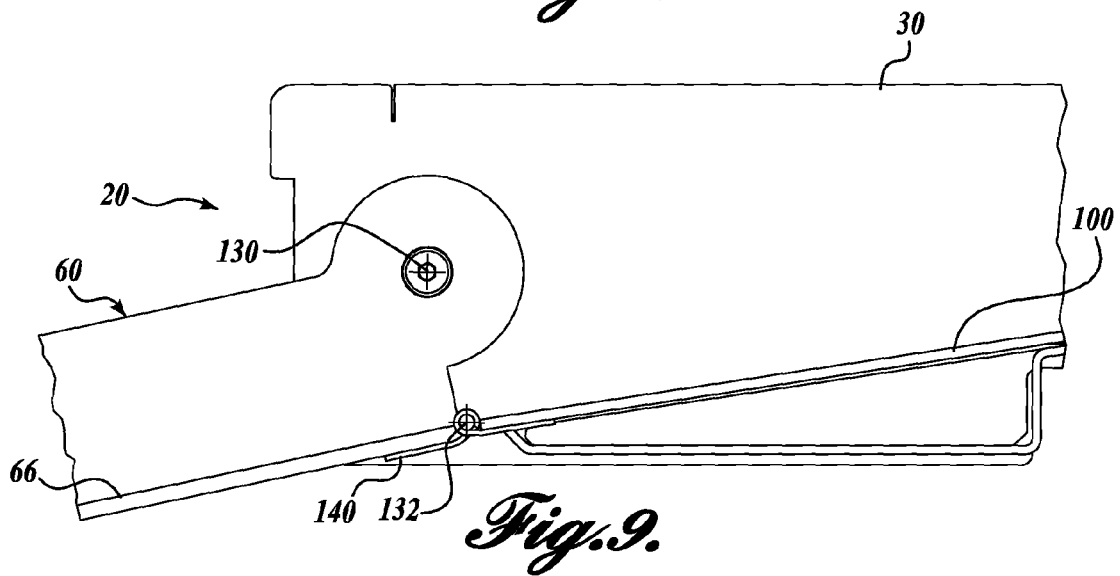
FIG. 9 is a partial cross-sectional side view of outboard end of the ramp assembly shown in FIG. 7, with the ramp portion in the deployed position.
Figure 10:
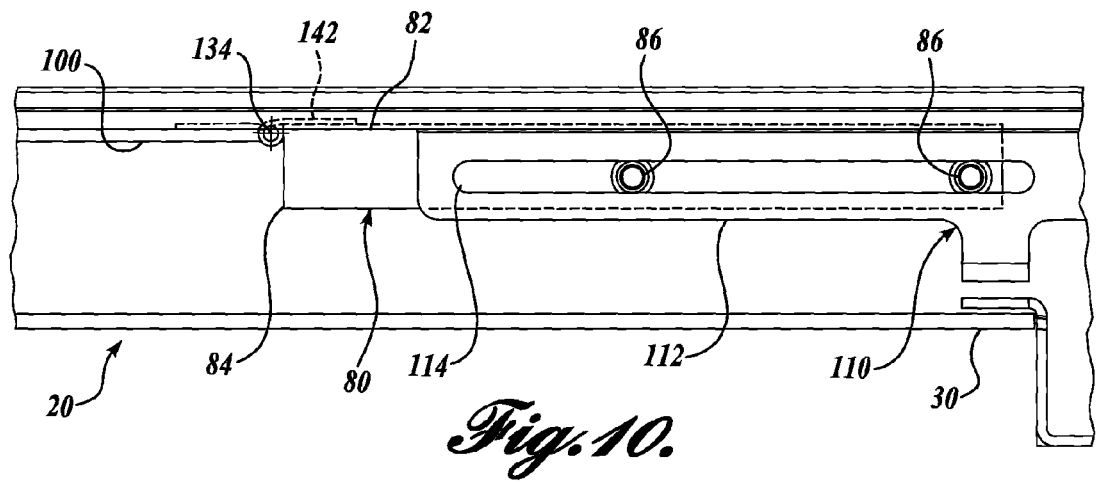
FIG. 10 is a partial cross-sectional side view of an inboard end of the ramp assembly shown in FIG. 4, with the ramp portion in the stowed position.
Figure 11:
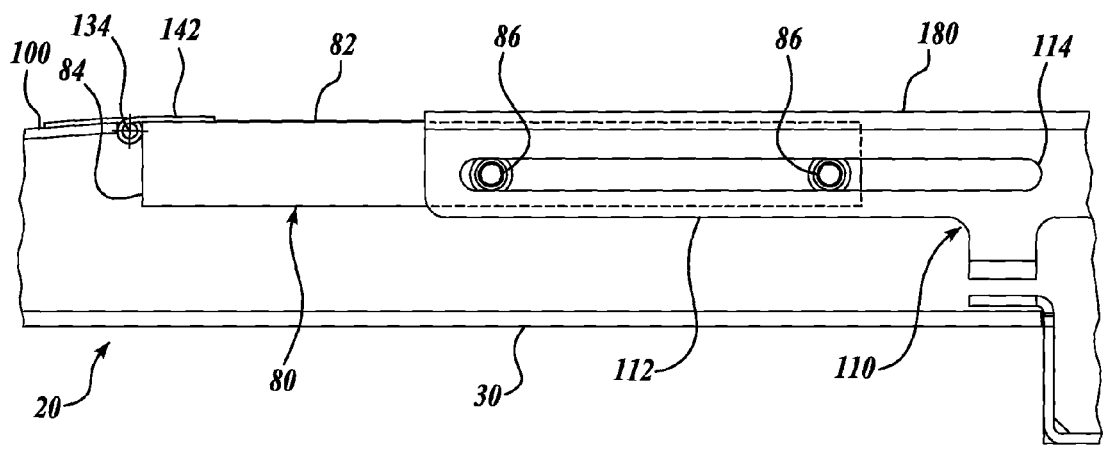
FIG. 11 is a partial cross-sectional side view of the inboard end of the ramp assembly shown in FIG. 10, with the ramp portion in the neutral position.
Figure 12:
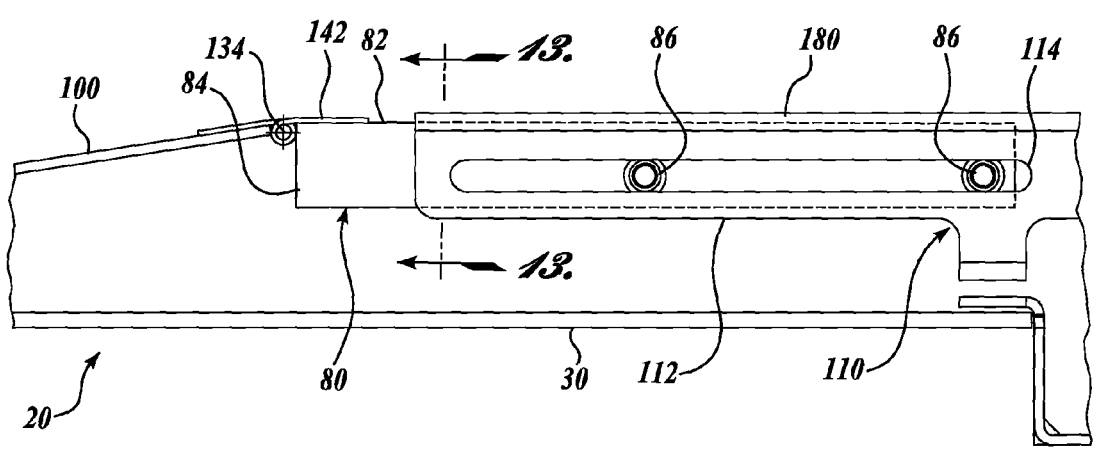
FIG. 12 is a partial cross-sectional side view of inboard end of the ramp assembly shown in FIG. 10, with the ramp portion in the deployed position.
Figure 13:
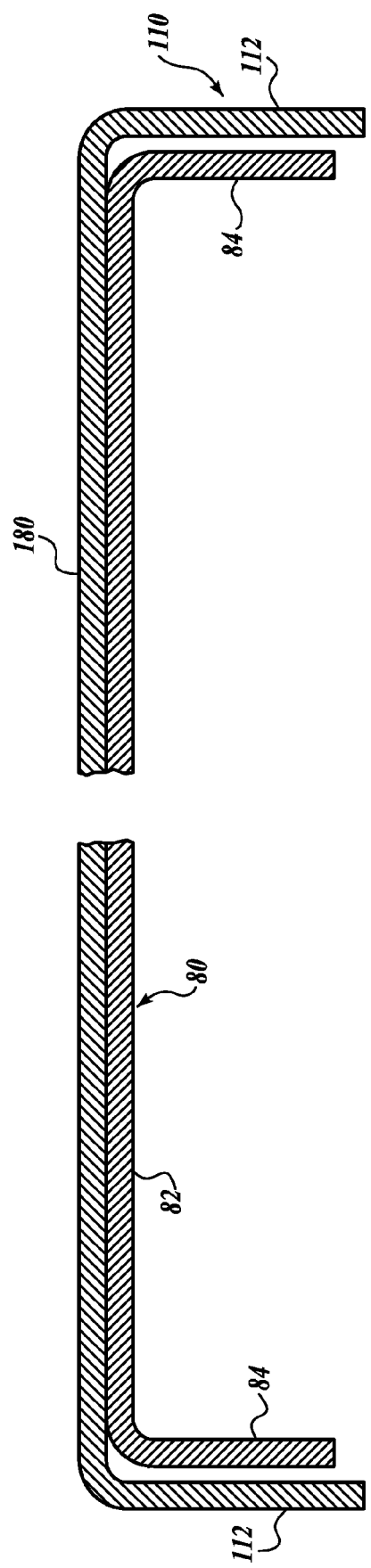
FIG. 13 is a partial cross-sectional end view of the ramp assembly shown in FIG. 12.

As best shown in FIG. 7-9, one end of the ramp portion 60 is pivotally connected to the frame 30 about an axis 130. The ramp portion 60 includes a panel 66 constructed from well-known materials. The ramp portion 60 further includes side curbs 68 that extend upwardly (when the ramp assembly is in the deployed position) from the forward and rear sides of the panel 66. The side curbs 68 increase the strength of the ramp portion 60 and provide edge guards for the sides of the ramp portion 60, thereby increasing the overall safety of the ramp assembly 20. The outboard end of the ramp portion 60 (when the ramp is in a deployed position) has a tapered nose portion 70 that provides a smooth transition between the panel 66 and the curb or road when the ramp assembly 20 is in a deployed position.

The intermediate panel 100 is made of materials known in the art and has a first end hingedly coupled to the ramp portion 60 by a hinge 140 about a hinge axis 132. As best shown in FIGS. 7-9, movement of the ramp portion 60 between the stowed position and the deployed position moves the hinge axis 132 in an arcuate path about axis 130. The hinged connection between the ramp portion 60 and the intermediate panel 100 supports and controls the position of the outboard end of the intermediate panel. As a result, movement of the ramp portion 60 from the stowed position to the deployed position moves the outboard end of the intermediate panel 100 along an arcuate path from a raised position (FIG. 7) to a lowered position (FIG. 9). Conversely, movement of the ramp portion from the deployed position to the stowed position moves the outboard end of the intermediate panel 100 along the arcuate path from the lowered position to the raised position.

Referring now to FIGS. 10-13, the inboard end of the intermediate panel 100 is hingedly coupled to the outboard edge of the inner panel 80 by a hinge 142 about hinge axis 134. In the illustrated embodiment, the inner panel 80 has a C-shaped cross section, i.e., a generally flat horizontal section 82 with downwardly extending legs 84 at the forward and rear edges of the horizontal section.

In the illustrated embodiment, the inner panel 80 is slidably associated with a guide 110 that is fixedly located relative to the transition panel 180, i.e., the guide 110 maintains a fixed position relative to the stowed position of the ramp. The guide 110 includes a pair of generally vertical legs 112 disposed parallel to and forward and rearward of the forward and rear legs, respectively, of the inner panel 80; that is, the legs 84 of the inner panel 80 are positioned between the legs 112 of the guide 110.

The engagement of the guide 110 with the inner panel 80 at the forward end of the ramp assembly will be described with the understanding that a similar configuration is used to engage the guide with the inner panel at the rear end of the ramp assembly 20. An elongate slot 114 is formed in the leg 112 of the guide 110 and extends in a generally inboard/outboard direction. One or more bearing elements 86 are attached to the inner panel 80 and extend into the elongate slot 114. As a result, movement of the inner panel 80 relative to the guide 110 is limited so that the inner panel is slidingly engaged with the guide. In the embodiment shown in FIGS. 10-13, the one or more bearing elements 86 are a pair of roller bearings mounted to the inner panel 80 and positioned to be disposed within the. The roller bearings engage the elongate slot 114 to support the inner panel 80 in a vertical direction, while allowing the inner panel to move in the inboard/outboard direction relative to the guide 110.

Alternate embodiments are contemplated to slidingly engage the inner panel 80 with the guide 110. In one alternate embodiment, the bearing elements 86 are pins fixedly secured to the inner panel 80 to engage the elongate slots 114. In other alternate embodiments, the elongate slots are located on the inner panel 80 and the bearing elements are located on the guides. Moreover, the number and positions of the bearing elements may vary. These and other configurations for slidingly associating the inner panel 80 with the guide 110 are contemplated and should be considered within the scope of the present disclosure.

A transition panel 180 extends between the forward and rear legs 112 of the guide 110. The transition panel 180 is sized and positioned to provide a transition surface between inner panel 80 and the floor of the vehicle in which the ramp assembly 20 is installed. In the exemplary embodiment of FIGS. 10-13, the transition panel 180 is a panel positioned over the inner panel 80. The transition panel 180 maintains a fixed position relative to the guide 110, and the inner panel 80 reciprocates inboard and outboard as the ramp portion 60 moves between the stowed and deployed positions. The position of the transition panel 180 and the movement of the inner panel 80 are such that a smooth transition exists between the transition panel 180 and the inner panel 80 in at least the stowed and deployed positions.

In one contemplated alternate embodiment, the transition panel 180 is hingedly coupled along the inboard end to the frame 30 or some other structure that maintains a fixed position relative to the frame. The outboard edge of the transition panel 180 slidingly engages the top surface of the inner panel 80 so that the inner panel supports the outboard edge of the transition panel.

In another contemplated embodiment, the transition panel 180 is a rising floor that reciprocates between a lowered position when the ramp portion is in the stowed position and a raised position when the ramp portion is in the deployed position. One example of a ramp configuration that utilizes a rising floor is illustrated in U.S. Pat. No. 8,230,539, the disclosure of which is expressly incorporated herein by reference. For those embodiments that utilize a moving floor as a transition panel, the guide can be fixedly secured relative to the transition panel. That is, the guide and, therefore, the inner panel, rises during deployment of the ramp portion and is lowered during stowage of the ramp portion. It will be appreciated that there are a variety of possible embodiments of the present ramp assembly configured to include a rising floor that acts as a transition panel. These and other configurations that provide a generally smooth transition between the inner panel 80 and the vehicle floor are contemplated and should be considered within the scope of the present disclosure.

Figure 4:
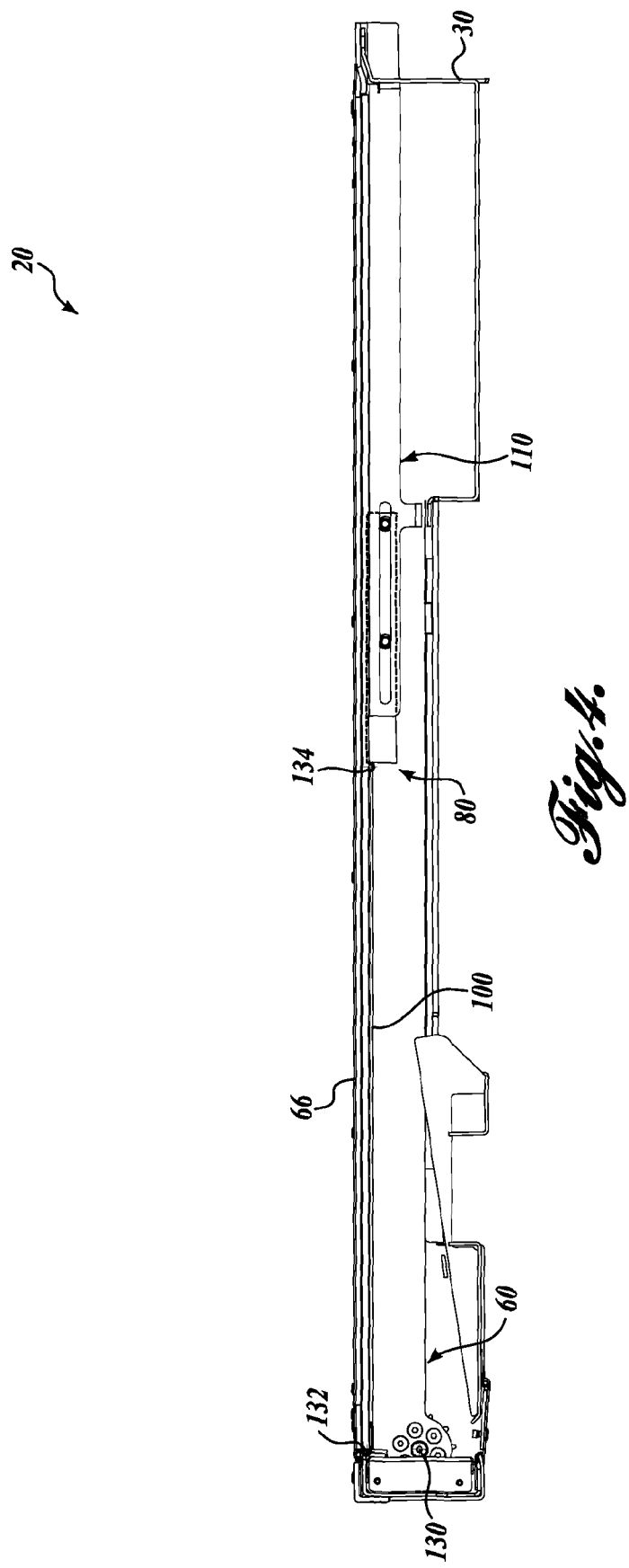
FIG. 4 is a cross-sectional side view of the ramp assembly shown in FIG. 1, with the ramp portion in the stowed position.
Figure 5:
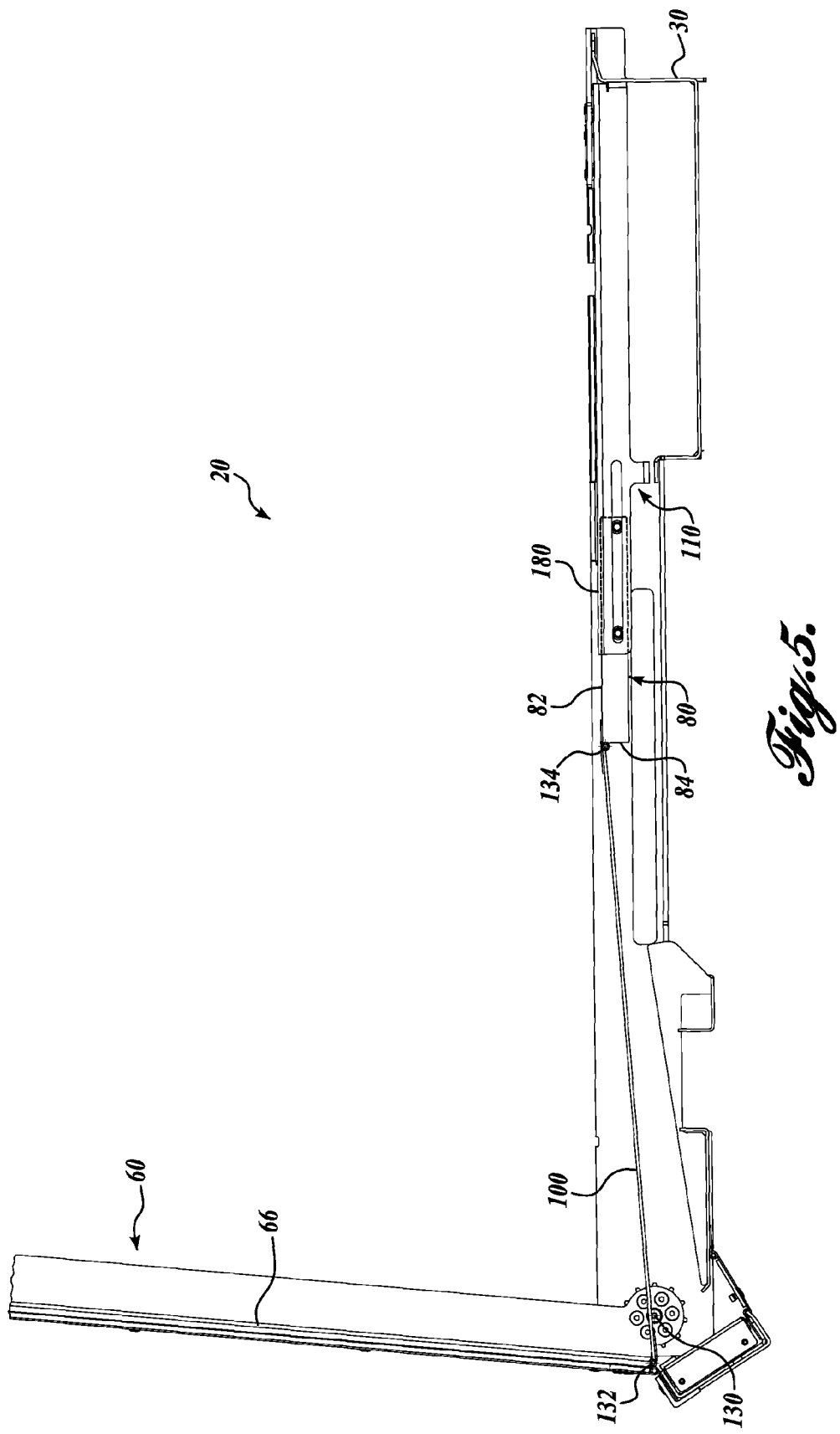
FIG. 5 is a partial cross-sectional side view of the ramp assembly shown in FIG. 4, with the ramp portion in the neutral position.

Referring back to FIGS. 4-6, deployment of the ramp assembly 20 is shown. In FIG. 4, the ramp assembly 20 is in the stowed position with the ramp portion 60 positioned over the inner panel 80 and the intermediate panel 100. The ramp portion 60 supports an outboard end of the intermediate panel 100 at the hinge axis 132, which is in a raised position. The inner panel 80 is located in an inboard position and supports the inboard end of the intermediate panel at hinge axis 134.

As the ramp assembly 20 moves from the stowed position (FIG. 4) to the neutral position (FIG. 5), the ramp portion 60 rotates in the counter-clockwise direction, moving hinge axis 132 in a downward and outboard direction along an arcuate path. Thus the outboard end of the intermediate panel 100 moves in a downward direction. In addition, the movement of the outboard end of the intermediate panel 100 moves the inboard end of the intermediate panel at hinge axis 134, causing the inner panel 80 to move in an outboard direction relative to the guide 110, i.e., to an extended position.

As the ramp assembly 20 moves from the neutral position (FIG. 5) to the deployed position (FIG. 6), the ramp portion 60 continues to rotate in the counter-clockwise direction, moving hinge axis 132 in a downward and inboard direction along the arcuate path until hinge axis 132 is in a lowered position. The inward travel of hinge axis 132 also moves hinge axis 134 in an inboard direction, thereby moving the inner panel 80 in an inboard direction relative to the guide 110.

Figure 6:
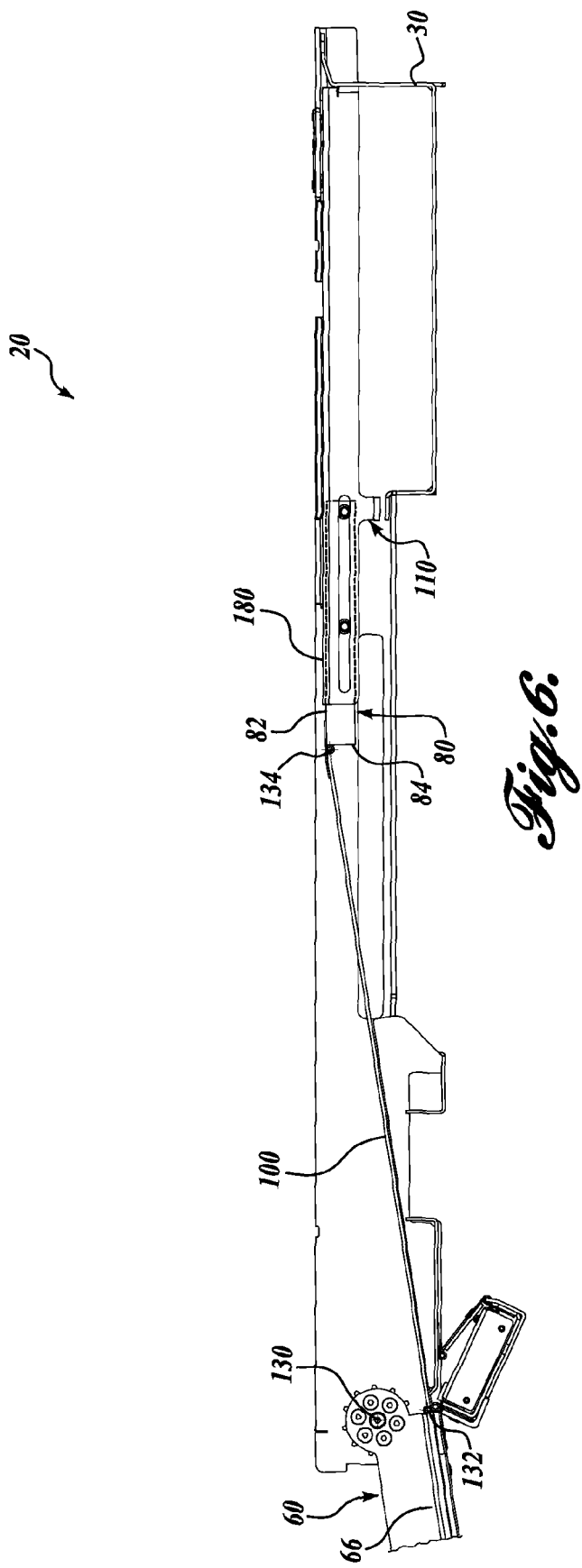
FIG. 6 is a partial cross-sectional side view of the ramp assembly shown in FIG. 4, with the ramp portion in the deployed position.

Referring to FIG. 6, when the ramp assembly 20 is in the deployed position, the ramp portion 60 extends in an outboard and downward direction. The intermediate panel 100 extends from the lowered position of hinge axis 132 to hinge axis 134. As a result, the intermediate panel 100 is approximately coplanar with the panel 66 of the ramp portion 60 to provide a smooth transition surface that extends from the inner panel to the alighting surface 22. It will be appreciated that the angle between the panel 66 of the ramp portion 60 and the intermediate panel 100 may vary, depending upon whether the ramp assembly 20 is deployed to a curb or a road, the presence of road crown, whether the ramp assembly is installed in a "kneeling" bus, and other factors.

Still referring to FIG. 6, the inner panel 80 is in a retracted position. When so positioned, the upper surface of the inner panel 80 cooperates with the transition panel 180 to provide a generally flat, horizontal transition surface between the intermediate panel 100 and the floor of the vehicle. Although the transition surface formed by the inner panel 80 and the transition panel 180 is generally horizontal in the illustrated embodiment, it will be appreciated that other embodiments are possible in which the transition surface is angled relative to a horizontal plane. Further, embodiments are contemplated wherein inner panel 80 and the transition panel 180 are not parallel, but instead form an angle therebetween when the ramp assembly 20 is in the deployed position. These and other variations are contemplated and should be considered within the scope of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ramp assembly, comprising:
   (a) a ramp portion coupled for rotational movement between a stowed position and a deployed position;
   (b) a first panel rotatably coupled to the ramp portion about a first axis, movement of the ramp portion between the stowed position and the deployed position moving the axis along an arcuate path;
   (c) a guide maintaining a fixed position relative to the stowed position of the ramp portion; and
   (d) a second panel slidably associated with the guide, the second panel being rotatably coupled to the first panel about a second axis.

2. The ramp assembly of claim 1, further comprising a transition panel fixedly positioned relative to the guide, the transition panel providing a transition between a vehicle floor and the second panel when the ramp portion is in the deployed position.

3. The ramp assembly of claim 2, wherein the second panel is at least partially disposed under the transition panel.

4. The ramp assembly of claim 3, wherein the ramp portion is positioned above the first panel and the second panel when the ramp portion is in the stowed position.

5. The ramp assembly of claim 1, wherein the guide comprises an elongate slot, the second panel comprising a bearing element extending at least partially through the elongate slot.

6. The ramp assembly of claim 1, wherein the second panel comprises an elongate slot, the guide comprising a bearing element extending at least partially through the elongate slot.

7. The ramp assembly of claim 1, wherein movement of the ramp portion from the stowed position to a neutral position moves the second panel in a first direction.

8. The ramp assembly of claim 7, wherein movement of the ramp portion from the neutral position to the deployed position moves the second panel in a second direction.

9. A ramp assembly, comprising:
   (a) a ramp portion coupled for rotational movement between a stowed position and a deployed position;
   (b) a first panel rotatably coupled to the ramp portion about a first axis, movement of the ramp portion from the stowed position to the deployed position moving the axis from a raised position to a lowered position;
   (c) a guide maintaining a fixed position relative to the stowed position of the ramp portion; and
   (d) a second panel slidably associated with the guide, the second panel being rotatably coupled to the first panel about a second axis.

10. The ramp assembly of claim 9, wherein the second axis moves in an outboard direction and then in an inboard direction as the ramp portion moves from the stowed position to the deployed position.

11. The ramp assembly of claim 9, further comprising a transition panel fixedly positioned relative to the guide, the transition panel providing a transition between a vehicle floor and the second panel when the ramp is in the deployed position.

12. The ramp assembly of claim 11, wherein the ramp portion is positioned above the first panel and the second panel when the ramp portion is in the stowed position.

13. The ramp assembly of claim 12, wherein the ramp portion is positioned above the transition panel when the ramp portion is in the stowed position.

\* \* \* \* \*